United States Patent [19]

Roberts

[11] Patent Number: 4,823,036
[45] Date of Patent: Apr. 18, 1989

[54] DISC COMMUTATOR AND BRUSH APPARATUS FOR BICYCLE

[76] Inventor: Robert E. Roberts, 2033 N. Sunset Rd., Apache Junction, Ariz. 85220

[21] Appl. No.: 683,014

[22] Filed: Dec. 18, 1984

[51] Int. Cl.$^4$ ............................................. H02K 13/04
[52] U.S. Cl. ........................................ 310/237; 439/16
[58] Field of Search ...................... 310/67 A, 239, 234, 310/237, 219; 340/134; 339/256 SP, 258 S, 5 R, 5 M, 6 R, 8 R

[56] References Cited

U.S. PATENT DOCUMENTS

| | | | |
|---|---|---|---|
| 1,315,796 | 9/1919 | Scott | 310/237 X |
| 3,310,694 | 3/1967 | Hanna et al. | 310/237 X |
| 3,492,626 | 1/1970 | Matthews | 339/256 SP |
| 3,538,365 | 11/1970 | Reisnecker | 310/237 |
| 4,225,848 | 9/1980 | Roberts | 340/134 |
| 4,332,430 | 6/1982 | Clark | 339/256 SP |
| 4,401,356 | 8/1983 | Bare | 339/258 R |

Primary Examiner—Mark O. Budd
Attorney, Agent, or Firm—H. Gordon Shields

[57] ABSTRACT

Electrical commutator and brush apparatus for a bicycle lighting system includes a dielectric disc having a conductive layer secured thereto and adapted to be secured to the spokes of a bicycle. Electrical contact with the commutator disc to supply electrical power is made by a spring contact brush secured to the axle of the bicycle wheel. Electrical power is taken from the disc by electrical connectors making contact with integral elements on the outer periphery of the disc.

4 Claims, 1 Drawing Sheet

U.S. Patent  Apr. 18, 1989  4,823,036
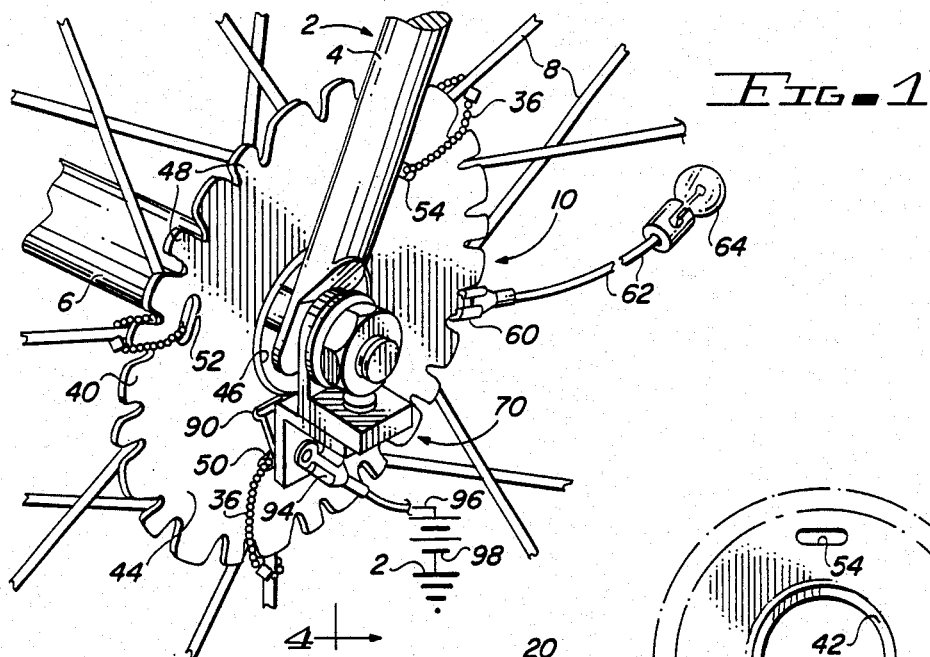
Fig-1
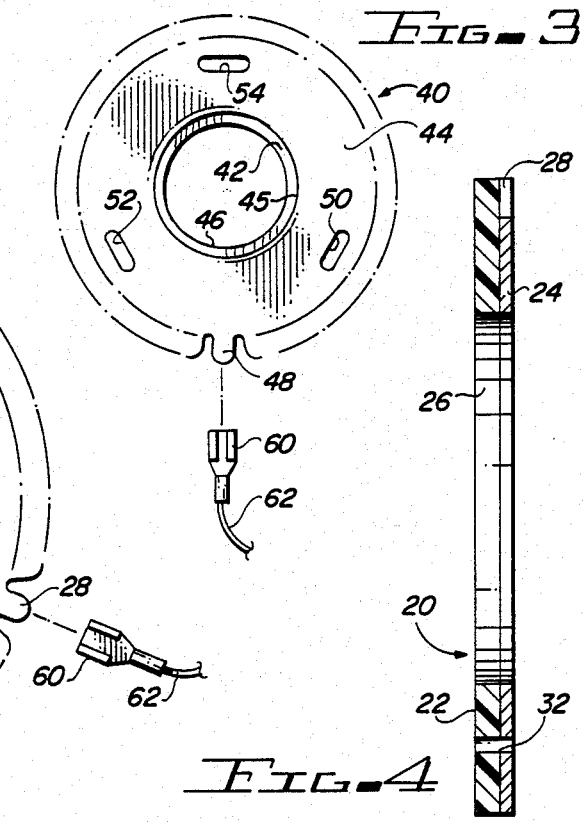
Fig-3
Fig-4
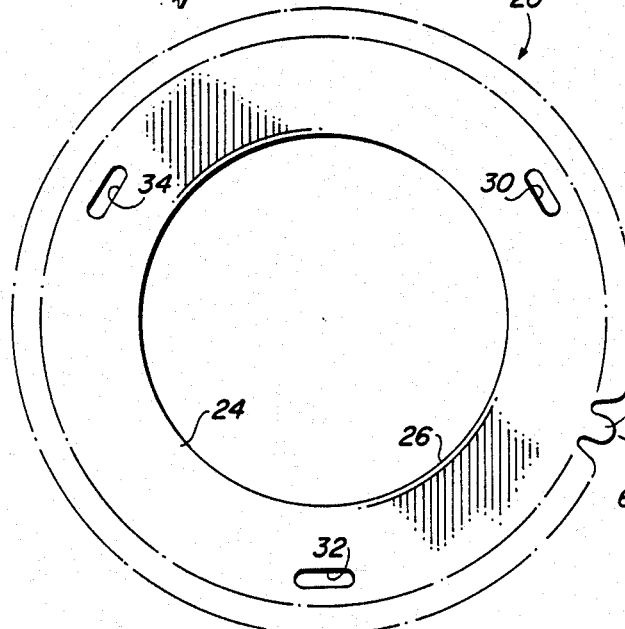
Fig-2
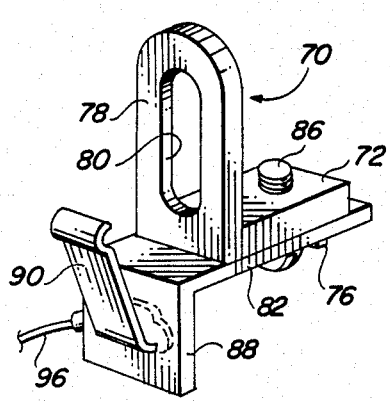
Fig-5
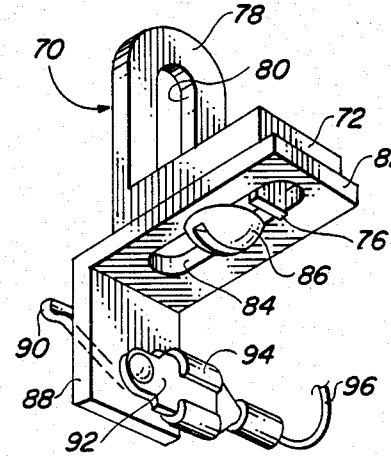
Fig-6
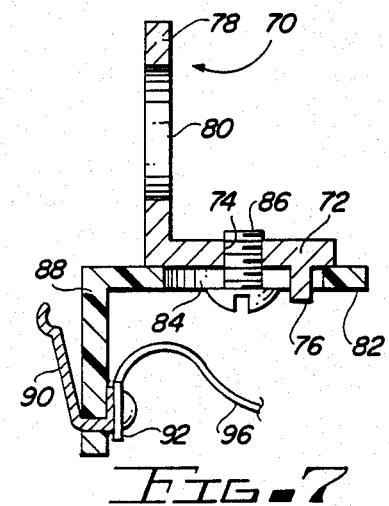
Fig-7

DISC COMMUTATOR AND BRUSH APPARATUS FOR BICYCLE

BACKGROUND OF THE INVENTION

1. Field of the Invention:

This invention relates to electrical systems and, more particularly, to electrical systems for bicycles in which a single electrical source is used to provide electrical power to lights secured to the front and rear wheels through a rotating disc and a fixed brush.

2. Description of the Prior Art:

U.S. Pat. No. 4,225,848, the inventor/patentee of which is the same as the inventor hereof, describes an electrical lighting system for bicycles in which a central electrical power source is connected to discs secured to the front and rear wheels of a bicycle. The discs are secured to the bicycle spokes concentric with the center of rotation or axle of each wheel. Electrical contact with the discs is made through a brush arrangement for electrical input and through wires extending outwardly from the discs to lights secured adjacent to the outer periphery or rim of the wheels.

The discs in the U.S. Pat. No. 4,225,848 comprise a dielectric substrate, such as resin impregnated fiberglass, on which a conductive layer, such as copper or the like, is secured. A brush system is used to make electrical contact with the discs as the discs rotate with the wheel. The brushes are secured to the axles and accordingly remain fixed while the wheels, and thus the discs, rotate. Electrical wires are connected to the conductive portion of the discs by soldering the ends of the wires to the disc. The wires then extend outwardly to light assemblies secured to the wheel spokes adjacent to the rim.

The brush assemblies include a housing having a bore in which a brush is disposed. The brush is biased against the disc by a conductive compression spring. An electrical conductor is in turn secured to the conductive spring to complete the circuit from the input conductor, through the spring, the brush, and to the conductive layer of the disc.

The securing of the electrical output wire from the conductive portion of the disc provides a potential problem in that if the wire comes loose, the inconvenience of having to make a soldered connection is required.

Another problem with the apparatus of the U.S. Pat. No. 4,225,848 is the brush assembly. The general type of brush employed in the U.S. Pat. No. 4,225,848 is generally conventional and is accordingly relatively well known in general principle. The provision of a brush housing, a conductive brush element, a conductive spring biasing the brush outwardly from the housing, and an electrical wire connected to the conductive spring, are elements that are generally well known and understood. However, the employment of such elements in the environment of a bicycle wheel results in potential problems that otherwise are not generally encountered in the typical protected environment of motors, etc. Again, the possibility of the electrical wire breaking contact with the conductive brush necessitates the inconvenience of a soldered connection, or the like.

Another problem with the prior art conventional brush assembly is the environment in which the brush assembly is used. Typically, brush assemblies of the general type disclosed in the U.S. Pat. No. 4,225,848 are found in relatively sheltered environments. However, a bicycle wheel is anything but a sheltered environment. The rotating wheel of a bicycle, and thus the brush assembly secured thereto, is constantly in contact with the outdoor elements of dirt and brushes; the wheel is typically subject to rain or water from puddles, etc. Thus, the likelihood of the brush assembly being involved in a relatively poor environment for purposes of good electrical contact is simply not present. A brush assembly could be rendered inoperative by dust, dirt, and debris getting into the housing and preventing the outward movement of the brush, or causing the spring to become frozen or locked within the housing, and accordingly not providing an outward bias against the brush. Other, related problems could also occur.

The "Description of the Prior Art" portion of the '848 patent discusses several other patents which disclose lighting systems for bicycles in which one or more lights is secured to the spokes of a bicycle wheel. The patents include U.S. Pat. No. 3,987,409 (Freeman), French Pat. No. 978,808, Belgian Pat. No. 500,337, and Italian Pat. No. 484,246.

The apparatus of the present invention overcomes the problems of the prior art and provides a disc and brush apparatus which are easily electrically installed, connected, and replaced, and which inherently avoid some of the problems of the prior art.

SUMMARY OF THE INVENTION

The invention described and claimed herein comprises a disc having a conductive layer disposed on a non-conductive substrate and having electrical contacts extending outwardly from the outer periphery of the disc and which are integral with the disc for ease of electrical connection and disconnection, and a spring brush element which is self-biased against the conductive portion of the disc and which also includes an integral tab for ease of electrical connection and disconnection.

Among the objects of the present invention are the following:

To provide new and useful electrical disc apparatus for a bicycle;

To provide new and useful electrical apparatus for a bicycle wheel;

To provide new and useful disc apparatus having integral electrical connector elements;

To provide new and useful brush apparatus in which a single spring element is self biased against a disc; and To provide new and useful disc apparatus securable to a bicycle wheel having a plurality of electrical connector tabs for electrically connecting the disc to a plurality of electrical connectors.

BRIEF DESCRIPTION OF THE DRAWING

FIG. 1 is a perspective view of the apparatus of the present invention shown in its use environment.

FIG. 2 is a plan view of a portion of the apparatus of the present invention.

FIG. 3 is a plan view of another portion of the apparatus of the present invention.

FIG. 4 is a view in partial section taken generally along line 4—4 of FIG. 2.

FIG. 5 is a perspective view of another portion of the apparatus of the present invention.

FIG. 6 is a perspective view of the apparatus of FIG. 5, taken from a different perspective from that shown in FIG. 5.

FIG. 7 is a side view in partial section of the apparatus of FIGS. 5 and 6.

DESCRIPTION OF THE PREFERRED EMBODIMENT

FIG. 1 is a perspective view of disc and brush apparatus 10 of the present invention shown in the use environment of a bicycle wheel. A portion of the front end of bicycle 2 and its front wheel is shown in FIG. 1. The portion of the bicycle 2 shown includes a front fork 4, a front wheel axle 6, and a plurality of spokes 8 extending outwardly from a hub (not shown) which is in turn secured to the axle 6. Included in the apparatus 10 is a front wheel disc 40 which is secured to the spokes 8 by a plurality of nonconductive or dielectric ties 36. The ties 36 may be well known nylon ties. The disc 40 rotates with the front wheel, and electric power is transferred to a disc 40 from or by a brush assembly 70.

There are two commutator discs used as part of the apparatus of the present invention, a large disc 20 and the small commutator disc 40. FIG. 2 is a plan view of the large disc 20. The large disc 20 is used in conjunction with the rear wheel. Due to the relative complexity of the rear wheel and axle assembly, the overall diameter of the disc 20 is substantially larger than that of the front wheel disc 40.

FIG. 3 is a plan view of the front wheel disc 40. FIG. 4 is a view in partial section of the large commutator disc 20, taken generally along line 4—4 of FIG. 2. The two discs 20 and 40 are substantially identical in configuration and in operation. They differ primarily in diameter.

FIG. 5 is a perspective view of the brush assembly 70. The brush assembly 70 may be used for either or both the front wheel and the rear wheel, and accordingly may be used with either the disc 20 or the commutator disc 40.

FIG. 6 is a bottom perspective view of the brush assembly 70. For the following discussion of the disc and brush apparatus 10 of the present invention, reference will be made to FIGS. 1-7.

As best shown in FIG. 4, the large disc 20 includes a substrate 22, which is nonconductive material, such as resin impregnated fiberglass, or the like, with a conductive surface 24 disposed on and secured to one side of the substrate 22. In the center of the disc 20 is a relatively large diameter aperture 26. On the outer periphery of the disc 22 is a plurality of integral, quick disconnect spade terminals 28. As indicated by the dash and dot circular lines in FIGS. 2 and 4, there may be a plurality of the spade terminals 28 spaced apart from each other on the outer periphery of both the large diameter disc 20 and the small disc 40. By having a plurality of the integral spade terminals, spaced apart as desired, the wiring of the apparatus 10 is enhanced. This will be discussed below in more detail.

There are three apertures 30, 32, and 34 extending through the substrate and the conductive surface of the disc 20 and located outwardly from the center aperture 26. The apertures 30, 32, and 34 are disposed relatively closely, radially speaking, to the spade terminals 28. The apertures 30, 32, and 34 are for the purpose of securing the disc 20 to the spokes of a wheel. As a practical matter, three apertures provide three suspension points for the commutator discs and have proven satisfactory in securing the discs to wheels. Nylon ties, which are nonconductive, such as the nylon ties 36 shown on FIG. 1, are preferably used to secure the discs to the spokes of a wheel.

The aperture 26 extends over the rear wheel hub so that no actual contact is made between the hub and the disc 20.

The smalller, front wheel disc 40, shown in plan view in FIG. 3, is substantially identical in construction to the large disc 20. As a matter of practical consideration for manufacturing purposes, the external diameter of the disc 40 is substantially the same as the diameter of the aperture 26 of the disc 20. Accordingly, the disc 40 is manufactured along with the disc 20, and is simply cut out of the center of the blank which comprises the substrate and conductive surface for both the discs 20 and 40. After the blank for the commutator disc 40 is cut from the blank out of which the disc 20 is made, the remainder of the blank, including the aperture 26, is then processed or machined to provide the space terminals 28 and the tie apertures 30, 32, and 34 for the disc 20. The same type of processing is also used for the small 40.

For convenience of illustrating the disc 40, the disc 40 is shown as including a substrate 42 and a conductive surface 44 disposed on the substrate 42. However, both the substrate 42 and the conductive layer 44 are simply continuations of the substrate 22 and the conductive surface 24 of the large disc 20. A relatively small diameter center aperture 46 is cut out of the interior of the blank for the disc 40. The aperture 46 is disposed over the center hub of the front bicycle wheel, as shown in FIG. 1.

The conductive surface 44 includes an inner periphery 45 spaced a short distance radially outwardly from the center aperture 46 to insure that no short circuit occurs between the wheel hub, axle, or fork. That is, there is a circular relieved band or area of substrate 42 between the aperture 46 and the beginning of the conductive layer 44.

The outer periphery of the small disc 40 includes a plurality of spaced apart spade terminals 48. The "plurality" of terminals may be any number of spade terminals 48 spaced apart on the outer periphery of the disc 40 as desired.

In practice, it has been determined that it is convenient to have at least four of the spade terminals on the smaller disc 40, and five of the spade terminals on the larger disc 20. However, there may be more, if desired. There probably should not be less than three, since three lights are probably the minimum number of lights required to effectively illuminate each of the front and back wheels of a bicycle. The arcuate spacing of the spade terminals should be sufficient to allow at least three lights to be connected to each wheel, and the three lights should be spaced apart about one hundred twenty degrees. The arrangement or spacing of the more than three terminals should still make it convenient to connect a minimum of three lights to each wheel, and to have the three lights equally spaced on the wheels in a convenient manner.

Spaced apart outwardly from the center aperture 46 of the disc 40, and in the general area of the spade terminals 48, radius-wise, are three apertures 50, 52, and 54. The apertures 50, 52, and 54 are used for securing the disc 40 to the front wheel. This is shown in FIG. 1. Plastic ties 36 are used to secure the disc 40 to the spokes 6.

The ties 36 are typically nylon ties having a one-way lock system. The nylon ties include a plurality of integral knobs which extend through a locking element. A tie is designed for only a single locking engagement. The tie must be broken in order to remove it from its locking engagement. Such ties are well known in the art.

The three-point suspension to the discs discussed herein has been shown to be effective. Obviously, the discs should be secured to the wheels by a relatively tight engagement so that the discs do not flap or otherwise move as the wheel rotates. The discs should accordingly be snugly held against the spokes. More than three suspension points may be required to secure a disc, particularly a large disc, to a wheel. The discs should maintain their planar configuration to provide good electrical contact to the brush assembly, as will be discussed below.

As indicated above, it is preferable to have at least three lights secured to each bicycle wheel, and on the spokes adjacent to the rims. The bicycle electrical system is designed so that the frame of the bicycle 2, including the wheels, provides for the ground return. This is illustrated schematically in FIG. 1. The discs 20 and 40 are accordingly insulated from the frame, and are provided with a nonconductive substrate.

Obviously, the nylon ties 36 are also nonconductive. If ties other than the nylon ties suggested herein are used, they must also be nonconductive so as not to provide a short circuit between the conductive surfaces of the discs and the spoke of the wheels.

Connected to the spade terminals on the discs are spade connectors 60. Conductors 62 are in turn secured to the connectors 60. The conductors 62 extend from the connector 60, and accordingly from the discs 20 and 40, outwardly to the electrical elements or light assemblies. One such light assembly 64 is schematically shown in FIG. 1, and is typically secured to the electrical elements or light assemblies. One such light assembly 64 is schematically shown in FIG. 1, and is typically secured to the wheel spokes adjacent to a rim. Electrical power from a battery 98 is thus transmitted to the light assemblies through the discs, the spade terminals of the discs, and the spade connectors 60 and conductors 62.

For providing electrical power to the discs from a generator or, more preferably, rechargeable battery 98, the brush assembly 70 is used. The brush assembly includes a bracket base 72 and a bracket arm 78 extending substantially perpendicularly to the bracket base 72. The bracket base 72 and the bracket arm 78 define a generally "L" shaped element, which may be made of metal if desired. A brush base 82 is secured to the bracket base 72. The brush base 82 is preferably made of nonconductive material.

The bracket arm 78 includes a slot 80. The slot 80 receives the end of a bicycle axle 6, as shown in FIG. 1. The nut on the end of the axle 6, used typically to secure a wheel to the frame fork 4, is also used to secure the brush assembly 70 to the bicycle frame. The slot 80 allows the brush assembly 70 to be moved as desired for appropriate positioning of the brush assembly. This will be discussed in more detail below.

The bracket base 72 includes a tapered aperture 74 which receives a screw 86 to secure the brush base 82 to the bracket base 72. A tang 76 extends outwardly from the bracket base 72 adjacent to the tapped aperture 74.

The brush base 82 includes a slot 84. The slot 84 is used to position the nonconductive brush base 82 relative to the bracket base 72. The tang 76 of the bracket base extends into the slot 82 to insure that the two bases remain in a parallel alignment. The screw 86 extends through the slot 84 and into the tapped aperture 74 in the bracket base 72. The screw 86 accordingly secures the brush base 80 and the bracket base 72 together. The screw 86 and the tang 76 insure the parallel alignment of the bases 72 and 82.

A brush arm 88 extends substantially perpendicularly to the brush base 82. The brush arm 88 and the brush base 82 also comprise a generally "L" shaped element.

On the brush arm 88, and extending outwardly therefrom is a brush 90. The brush 90 is made of conductive, springy material to provide an inherent outward bias from the brush arm 88 to a commutator disc to provide and maintain electrical contact between the brush 90 and the disc.

The brush 90 is appropriately secured to the brush arm 88 and to a spade terminal 92 which is on the opposite side of the brush arm 88 from the brush 90. The spade terminal 92 is electrically connected to the brush 90. A spade connector 94 is shown secured to the spade terminal 92, and a conductor 96 extends outwardly from the connector 94. The conductor 96, of course, extends to an appropriate electrical source, such as the battery 98. (See FIG. 1). The battery 98 provides power through the conductor(s) 96, the conductor(s) 94, the spade terminal(s) 92, and the brush(es) 90 to (the) disc(s) and in turn from the disc(s) to a plurality of lights by means of the integral spade terminals disposed on the outer periphery of each commutator disc. As is best shown in FIG. 1, the brush 90 makes electrical contact with the rotating commutator disc 40 as the wheel of the bicycle rotates, carrying the commutator disc 40 with it.

For helping to insure electrical contact integrity and to prevent inadvertent shorting, a dielectric or nonconductive plastic shrink tubing insulation (not shown) is preferably disposed about the connectors 60 and 94.

The brush assembly 70 is usable for both the front wheel and the rear wheel of a bicycle. Both vertical adjustment and horizontal adjustment of the brush assembly 70 may be made through the slots 80 and 84. Vertically, the brush assembly 70 may be positioned relative to an axle bolt on a wheel. Horizontally, the brush arm may be moved relative to the brush base by means of the slot 84 and the screw 86. Thus, the brush arm 88 may be moved inwardly towards a disc or outwardly away from a disc, as required, to provide best electrical contact between the brush 90 and a commutator disc.

A virtual three-dimensional adjustment or positioning of the brush may be made by simply rotating the entire brush assembly 70 relative to the axle bolt. The brush assembly 70 may be rotated as desired to position the brush 90 relative to the wheel and may be placed in any desired orientation, limited only by the position of the fork 4 and the location of the battery 98 or of the length of the conductor 96. Obviously, there may be practical limitations in the positioning of the brush assembly, but such limitations are not due to the design of the brush apparatus 70. Rather, such limitations are due to the inherent design of a bicycle 2, particularly the bicycle frame to which the apparatus is secured, and to the location of the battery 98, or to the running of the cable 96 from the battery to the spade terminal 92 of the brush assembly 70.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Electrical and brush apparatus for an electrical system for a bicycle, comprising, in combination:
   a conductive frame;
   a wheel rotatable on an axle and secured to the frame;
   at least a single electrical element secured to the wheel;
   a source of electrical power;
   disc means secured to and rotatable with the wheel, including
      a central aperture for receiving the wheel axle,
      an outer periphery,
      a nonconductive substrate,
      a conductive layer on the substrate between the central aperture and the outer periphery, and
      a terminal on the outer periphery integral with the substrate and the conductive layer;
   connector and conductor means for electrically connecting the terminal with the electrical element;
   brush means secured to the frame, including
      a bracket base,
      a bracket arm connected to the bracket base for securing the bracket base to the frame,
      a brush base secured to the bracket base,
      a brush arm connected to the brush base, and
      a brush secured to the brush arm and electrically contacting the conductive layer of the disc means; and
   conductor means electrically connecting the brush to the source of electrical power.

2. The apparatus of claim 1 in which the bracket arm is adjustably secured to the frame.

3. The apparatus of claim 2 in which the brush base is adjustably secured to the bracket base.

4. The apparatus of claim 1 in which the disc means includes a plurality of terminals spaced apart from each other on the outer periphery.

* * * * *